(12) United States Patent
Devine et al.

(10) Patent No.: US 12,441,489 B2
(45) Date of Patent: Oct. 14, 2025

(54) DEVICES FOR PROTECTING A BODY FROM DAMAGE

(71) Applicant: Graphene Composites Limited, Stockton-on-Tees (GB)

(72) Inventors: Stephen Devine, Hebburn (GB); Sandy Chen, Balcombe (GB)

(73) Assignee: Graphene Composites Ltd., Stockton-On-Tees (GB)

( * ) Notice: Subject to any disclaimer, the term of this patent is extended or adjusted under 35 U.S.C. 154(b) by 154 days.

(21) Appl. No.: 18/002,006

(22) PCT Filed: Jun. 16, 2021

(86) PCT No.: PCT/GB2021/051508
§ 371 (c)(1),
(2) Date: Dec. 15, 2022

(87) PCT Pub. No.: WO2021/255444
PCT Pub. Date: Dec. 23, 2021

(65) Prior Publication Data
US 2023/0241862 A1 Aug. 3, 2023

(30) Foreign Application Priority Data
Jun. 18, 2020 (GB) .................................. 2009330

(51) Int. Cl.
*B64G 1/50* (2006.01)
*B32B 3/14* (2006.01)
(Continued)

(52) U.S. Cl.
CPC ................. *B64G 1/50* (2013.01); *B32B 3/14* (2013.01); *B32B 5/18* (2013.01); *B32B 9/007* (2013.01);
(Continued)

(58) Field of Classification Search
CPC .. B32B 3/14; B32B 5/18; B32B 9/007; B32B 3/20; B32B 2266/126; B32B 2307/302; B32B 2605/00; F28F 21/02; B64G 1/58
(Continued)

(56) References Cited

U.S. PATENT DOCUMENTS

| 4,986,495 A | 1/1991 | Stromath |
| 2010/0194179 A1 | 8/2010 | Waltz |

(Continued)

FOREIGN PATENT DOCUMENTS

| CN | 107792401 | 3/2018 |
| CN | 107792401 A | 3/2018 |

(Continued)

OTHER PUBLICATIONS

International Search Report received in PCT/GB2021/051508, Dec. 23, 2021, 28 pp.
(Continued)

*Primary Examiner* — Steve S Tanenbaum
(74) *Attorney, Agent, or Firm* — Kilpatrick Townsend & Stockton LLP

(57) ABSTRACT

A device for protecting a body from damage. The protective device comprises an outer protective cover, the outer protective cover comprising a thermal energy conduction element for transferring thermal energy through at least part of the outer protective cover and an inner assembly located adjacent the outer protective cover, the inner assembly comprising a thermal energy transfer device adapted to transfer thermal energy to and/or from the thermal energy conduction element. The thermal conduction element comprises a graphite-like or pyrolytic graphite-like material and the thermal energy transfer device comprises a thermal energy transfer fluid.

15 Claims, 2 Drawing Sheets

(51) Int. Cl.

| | | |
|---|---|---|
| *B32B 3/20* | (2006.01) | |
| *B32B 5/18* | (2006.01) | |
| *B32B 9/00* | (2006.01) | |
| *B64G 1/58* | (2006.01) | |
| *F28F 21/02* | (2006.01) | |
| *H05K 5/02* | (2006.01) | |

(52) U.S. Cl.
CPC ........... *F28F 21/02* (2013.01); *H05K 5/0209* (2022.08); *B32B 3/20* (2013.01); *B32B 2266/126* (2016.11); *B32B 2307/302* (2013.01); *B32B 2605/00* (2013.01); *B64G 1/58* (2013.01)

(58) Field of Classification Search
USPC .......................................................... 165/10
See application file for complete search history.

(56) References Cited

U.S. PATENT DOCUMENTS

| | | | |
|---|---|---|---|
| 2010/0263187 A1* | 10/2010 | Matviya | B32B 9/046 29/428 |
| 2011/0253344 A1* | 10/2011 | Kuhn | B64C 3/36 165/104.19 |
| 2012/0186789 A1 | 7/2012 | Sedarous | |
| 2014/0077138 A1 | 3/2014 | Tijerina | |
| 2014/0287641 A1 | 9/2014 | Steiner | |
| 2015/0198380 A1 | 7/2015 | Haj-Hariri | |
| 2016/0168442 A1 | 6/2016 | Lievens | |
| 2016/0265857 A1 | 9/2016 | Benthem | |
| 2020/0061970 A1 | 2/2020 | Chen | |
| 2020/0194179 A1 | 6/2020 | Yializis | |

FOREIGN PATENT DOCUMENTS

| | | |
|---|---|---|
| CN | 110626011 | 12/2019 |
| CN | 110626011 A | 12/2019 |
| CN | 110749222 | 2/2020 |
| GB | 2557739 | 6/2018 |
| WO | 2020035705 | 2/2020 |

OTHER PUBLICATIONS

Examination Report received for GB application No. GB2009330.8, dated Jun. 29, 2023, 6 pp.
Combined Search and Examination Report received for GB application No. GB2211227.0, dated Oct. 28, 2022.
Examination Report received for GB application No. GB2009330.8, dated Oct. 28, 2022.
Search Report received for GB application No. GB2009330.8m dated Nov. 30, 2021.
Examination Report received in GB application No. GB2211227.0, dated Jun. 29, 2023.
PCT/GB2021/051508; International Search Report and Written Opinion; Dec. 23, 2021; 28 pages.
Chinese Application No. 2021800437581-Second Office Action dated Jul. 9, 2025, 46 pp.

* cited by examiner

DEVICES FOR PROTECTING A BODY FROM DAMAGE

FIELD

The invention relates to devices for protecting a body from damage, in particular external heat damage.

BACKGROUND

Thermal energy (e.g. heat) damage is a common problem in many different applications, from circuit electronics in datacentres to aerospace environments. Thermal energy management systems are designed to heat or cool the affected devices to enable smooth operation. These systems can use a number of different methods of cooling, but often employ heat transfer methods based on fluid transfer or conduction transfer. However, many existing heat management systems are inefficient owing to the use of materials which struggle to achieve efficient heat dissipation owing to their inadequate thermal conductivities.

Moreover, the most efficient thermal energy management systems are often bulky and heavy, limiting their use in high-tech industries (such as aerospace). For example, aerospace vehicles such as rockets, re-entry vehicles, etc. have restrictive weight and dimensional limitations. While there are some lightweight solutions in the electronics industry, these have limited applicability to other industries. For example, there are numerous cooling systems in electronics (e.g. heat sinks), but these have limits and, importantly, are not practical for use in outdoor or high-exposure environments. Instead, these are designed for operation in precisely controlled environments where the temperature fluctuations are within a relatively small window and they are protected from physical damage. These are also primarily designed to dissipate heat from the device which is being protected, rather than to protect it from external heat generation.

There is therefore a need for an improved thermal energy management system which exhibits highly efficient thermal energy transfer (e.g. heat dissipation).

SUMMARY

A first aspect provides a device for protecting a body from damage. The device comprises an outer protective cover, the outer protective cover comprising a thermal energy conduction element for transferring thermal energy through at least part of the outer protective cover; and an inner assembly adjacent to the outer protective cover, the inner assembly comprising a thermal energy transfer device adapted to transfer thermal energy to and/or from the thermal energy conduction element. The thermal conduction element comprises a graphite-like or pyrolytic graphite-like material (including graphite and pyrolytic graphite). The thermal energy transfer device comprises a thermal energy transfer fluid (adapted to transfer thermal energy to and/or from the thermal energy conduction element).

Embodiments thus provide a thermal management device that can protect a body (e.g. a device, or element) from damage. This includes thermal energy damage (e.g. damage as a result of heat or cold), but may also include physical damage, such as an impact from an external object. The outer protective cover is a protective element adapted to protect the inner assembly and/or body from damage, such as physical damage. It comprises at least a thermal energy conduction element and may further comprise a protective layer. The thermal conduction element can therefore transfer the heat through (e.g. across the face of or through the thickness of) the outer protective cover thereby dissipating thermal energy (e.g. heat) build up. This can, for example, avoid hotspots that may otherwise build up and damage the device and/or body and/or be used to transfer thermal energy from an outer surface of the device to another part of the device.

Graphite-like or pyrolytic graphite-like materials (or graphite-type or pyrolytic graphite-type materials) are particularly effective at transferring heat and so form particularly effective heat transfer materials. Moreover, this can be achieved in a single direction due to the anisotropic properties of these materials. This can be particularly effective when combined with a secondary cooling mechanism, such as the thermal energy transfer device. In particular, thermal energy can be quickly and efficiently be transferred between an external environment and the thermal energy transfer device via the thermal conduction element. These efficient heat transfer of these particular materials and the transfer in one particular direction allows for minimal losses to other parts of the device (and a body which is it protecting) thereby reducing damage to those parts and improving efficiency of the heat transfer. Moreover, these materials also demonstrate excellent stability, strength, wear resistance, fatigue resistance. This enables use in the outer protective layer as they are less prone to damage under harsh conditions, such as those experienced by aerospace vehicles.

Combined with a fluid (e.g. liquid) transfer device, this provides a very efficient way of transferring heat to or away from an area (e.g. the surface or body of the outer protective cover). The graphite-like or pyrolytic graphite-like materials provide very effective thermal transfer over the distance of a part of the outer protective cover, which combines with the fluid transfer device to further transfer the thermal energy. This can be carried out e.g. over greater distances than would be possible (cost-wise and practically wise) with a graphite-like or pyrolytic graphite-like material.

By outer, it is meant that the protective cover is outer relative to the thermal energy transfer device and, preferably, other components of the device when assembled on or around a body. That is, the thermal energy device and, optionally, other components may be located inwardly of the device. When assembled on the device, it is outwardly of the thermal energy transfer device (and a backing structure, where present). For example, if the device is a protective cover for a vehicle, the outer protective cover forms at least a part of the outermost part of the device relative to the vehicle. Further components may be provided on the outside of the protective cover (e.g. there may be a further outer skin or coating). The adjacent inner assembly thus can be behind the outer protective cover.

By graphite-like material, it is meant materials having a two-dimensional planar structure sheet comprising atoms arranged in a (graphite-like or graphene-like) hexagonal formation. This includes six membered rings with sp2-hybridized carbon atoms but may include other structures, including six membered rings with atoms other than carbon. For example, this material may comprise at least one planar layer comprised of hexagonal six membered rings comprising (or consisting essentially of) carbon, boron, nitrogen and combinations thereof. This can include graphene (e.g. graphene, functionalised graphene, graphene oxide), which is a two-dimensional allotrope of carbon with a single layer of graphene includes a single planar sheet of sp2-hybridized carbon atoms. This may also be graphite. Graphene comprises at least 1 atomic layer of graphene and may be up to e.g. 10 or 15 atomic layers of graphene. Above this, graphene is referred to as graphite. In some embodiments, this may be hexagonal boron nitride (also referred to as h-BN, α-BN, and graphitic boron nitride (g-BN)). These may be functionalised.

By pyrolytic graphite-like (or pyrolytic carbon-like) material, it is meant a material having a two-dimensional sheet comprising atoms arranged in a (graphite-like or graphene-like) hexagonal formation but with deformities such that there is some covalent bonding between the sheets. This includes six membered rings with sp2-hybridized carbon atoms but may include other structures, including six membered rings with atoms other than carbon. For example, this material may comprise at least one planar layer comprised of hexagonal six membered rings comprising (or consisting essentially of) carbon, boron, nitrogen and combinations thereof. Pyrolytic graphite is an example of a pyrolytic graphite-like material that has excellent thermal conductivity (1700 $W \cdot m^{-1} \cdot k^{-1}$ at room temperature compared to 400 $W \cdot m^{-1} \cdot k^{-1}$ for copper). It is very efficient at thermal spreading over a range of thermal energy transfer applications (heating and cooling), while also being extremely lightweight. Another example is pyrolytic hexagonal boron nitride. Other examples include pyrolytic graphite-boron compounds (e.g. pyrolytic graphite with <2% boron). These may be functionalised.

Accordingly, in embodiments, the graphite-like or pyrolytic graphite-like material is selected from graphene, pyrolytic graphite, pyrolytic carbon, pyrolytic hexagonal boron nitride, or combinations thereof. In embodiments, the graphite-like or pyrolytic graphite-like materials may be in the form of sheets, platelets, or other structures (e.g. fullerenes, nanotubes).

In an embodiment, the thermal energy transfer fluid comprises a nanofluid (i.e. a heat transfer fluid comprising a nanoparticle component). Nanofluids are excellent replacements for traditional cooling fluids as the added nanomaterial component can increase the thermal conductivity of the fluid significantly while having a minimal effect on other properties such as the viscosity of the fluid. One family of materials which is proving to be very applicable to this heat management field is the 2D materials family. Nanomaterials can be broadly classified by the total number of their nanoscopic dimensions: If all three dimensions of a material are nano-sized, it would be called a 0D (zero-dimensional) material, more commonly known as a nanoparticle. If two dimensions of a material are nano-sized, with the other dimension much larger (much like a piece of string shrunk down to a tiny size), then this is a 1D material or 'nanotube/nanowire'. If only one dimension is nano-sized, it would be a 2D material—resembling a large, but very thin sheet.

In an embodiment, the nanofluid comprises at least one of ZnO, hexagonal boron nitride, graphene or diamond nanoparticles. As shown below, these provide particularly effective nanofluids. In a preferred embodiment, the nanofluid comprises hexagonal boron nitride and/or graphene nanoparticles. In a particularly preferred embodiment, the nanofluid comprises turbostatic hexagonal boron nitride and/or turbostratic graphene.

In an embodiment, the inner assembly further comprises a support structure. The support structure can be adapted to support the outer protective cover and/or may provide further protection against damage for the body. For example, the support structure may be a scaffold on which the outer protective cover is formed. In an embodiment, the support structure comprises an aerogel (e.g. the structure may comprise a layer comprising or consisting of an aerogel). Aerogels are a class of highly porous (typically nano-porous) solid materials with a very low density and which are very strong relative to their weight, making them useful in composites. Aerogels are formed by creating a gel and subsequently drying the gel to remove the liquid component (e.g. using supercritical drying). This creates the unique structure which contributes to the advantageous properties, including low density and the ability to transfer and dissipate impact forces effectively. Moreover, they are particularly effective insulators, so can further help to control thermal management and reduce the risk of damage to components.

More particularly, an aerogel is an open-celled structure with a porosity of at least 50% (but preferably with a porosity of at least 95% air (e.g. 95 to 99.99%), optionally at least 99%) produced by forming a gel in solution and subsequently removing the liquid component of the gel using supercritical heating. As a result of the drying conditions, the solid portion of the gel maintains its structure as the liquid component is removed, thereby creating the porous body. The pores of an aerogel will typically have a pore size in the range of 0.1 to 100 nm, typically less than 20 nm. In embodiments, however, the aerogel can have a pore size in the range of 0.1 to 1000 nm, optionally 0.1 to 900 nm; 10 to 900 nm; 20 to 900 nm; 20 to 500 nm; or 20 to 100 nm. In embodiments, the porosity and pore size distributions of the aerogels can be measured using nitrogen absorption at 77K and applying the Brunauer, Emmit and Teller (BET) equation (see "Reporting Physisorption Data for Gas/Solid Systems" in Pure and Applied Chemistry, volume 57, page 603, (1985)). An aerogel can be formed from a number of materials, including silica, organic polymers (including polyimide, polystyrenes, polyurethanes, polyacrylates, epoxies), biologically-occurring polymers (e.g. gelatin, pectin), carbon (including carbon nanotubes), some metal oxides (e.g. iron or tin oxide), and some metals (e.g. copper or gold). In some embodiments, the aerogel is a cross-linked aerogel (e.g. the aerogel is formed from a cross-linked polymer, e.g. a cross-linked polyimide). Such aerogels are advantageously flexible and strong. Aerogels offer increased impact absorbing properties as they offer a much broader cone of force dispersion than the components of prior art composites and thus impact forces can be dispersed much more quickly and widely. This is at least in part due to the ability of these layers to spread impacts out in the plane of the layer, as well as through the height of the layer. In particular, the "nano-auxetic" structure of aerogels can provide them with shock-absorbing properties—the nanometre-sized tree-branch-like atomic structures spread the force of an impact along those branches, thereby rapidly dissipating the force of an impact.

In an embodiment, the support structure further comprises a composite comprising first and second layers, the first layer comprising the aerogel and the second layer comprising a protective layer. The protective can have a higher tensile strength than any other material in the inner assembly. The layer may have a tensile strength of at least 200 MPa, at least 500 MPa, at least 1000 MPa; for example, 250 MPa to 5000 MPa; 1000 MPa to 5000 MPa. This can be measured, for example, by ASTM D7269 where the protective layer is a fibre-based layer and ASTM D3039 for polymer matrix based materials. The protective layer can be arranged to absorb a portion of any impact on the outer protective layer and provides structure and support to the device. Together with the aerogel layer acting as impact absorbing layers this can reduce the force transferred through the structure. In an embodiment, the protective layer comprises a metal, an alloy, a polymer and/or a carbon containing material, preferably a polymer and/or a carbon-containing material. For example, the protective layer may comprise a high-tensile polymer and/or carbon fibre containing material. In a further embodiment, the protective layer comprises a high-tensile material selected from the group consisting of aramid (aromatic polyamide) fibres, aromatic polyamide fibres, boron fibres, ultra-high molecular weight polyethylene (e.g. fibre or sheets), poly(p-phenylene-2,6-benzobisoxazole) (PBO), poly{2,6-diimidazo[4,5-b:4',5'-e]-pyridinylene-1,4(2,5-dihydroxy)phenylene} (PIPD) or combinations thereof. For example, in one embodiment, the protective layer is a UHMWPE textile with a weight of between 100 and 200 gsm, optionally between 140 and 180 gsm. Where fibres are used, the layer can comprise a binder, such as an epoxy resin. In an embodiment, the protective layer has a thickness of 50 μm to 500 μm, optionally 125 μm to 250 μm. In embodiments where there are a plurality of protective layers, each protective layer has a thickness of 50 μm to 500 μm, optionally 125 μm to 250 μm.

In an embodiment, the outer protective cover comprises a housing and the thermal energy conducting element is enclosed within the housing. The housing may be comprised of aluminium, copper, kapton, carbon fibre, copper molybdenum alloy.

In an embodiment, the device further comprises a thermoelectric generator, wherein the generator is adapted to receive thermal energy from the thermal energy conduction element and convert the thermal energy into electrical energy. A thermoelectric generator, or Seebeck generator, is a solid-state device that converts heat flux to electrical energy through a phenomenon known as the "Seebeck effect". This effect describes that a temperature gradient in a conducting material results in heat flow; this results in the diffusion of charge carriers. The flow of charge carriers between the hot and cold regions in turn creates a voltage difference. This is particularly advantageous as it allows for the use of heat transferred through the device, which would ordinarily be dumped the excess energy out through a heat sink/dump to the environment, to be utilised. For example, in aerospace vehicles (e.g. re0entry or highspeed vehicles) the heat can be used to power other components and thus reduce reliance on batteries, which are often heavy and take up space/increase profile.

A second aspect provides a device for protecting a body from damage. The device comprises an outer protective cover, the outer protective cover comprising a thermal energy conduction element for transferring thermal energy through at least part of the outer protective cover; and an inner assembly adjacent to the outer protective cover. The inner assembly comprises a thermal energy transfer device adapted to transfer thermal energy to and/or from the thermal energy conduction element; and a support structure. The thermal conduction element comprises a graphite-like or pyrolytic graphite-like material (including graphite and pyrolytic graphite) and the support structure comprises an aerogel.

Embodiments thus provide an effective thermal energy control device, such as a device that is adapted to protect a body from heat damage. As set out above, the recited materials provide robust and effective protection, while the graphite-like or pyrolytic graphite-like material provides excellent heat transfer. This can be using a solid thermal energy transfer device (e.g. additional thermal conductive elements such as heat vias or tracks).

In embodiments, the features of the second aspect are as set out in respect of the first aspect. In other words, the specific embodiments referred to in respect of the first aspect apply equally to the second embodiment.

For example, in embodiments, the graphite-like or pyroltyic graphite-like material is selected from graphene, pyrolytic graphite, pyrolytic carbon, pyrolytic hexagonal boron nitride, or combinations thereof.

In embodiments, the thermal energy transfer device comprises a thermal energy transfer fluid. As in the first aspect, in embodiments the thermal energy transfer fluid comprises a nanofluid. The nanofluid may comprise at least one of ZnO, hexagonal boron nitride, graphene or diamond nanoparticles.

In an embodiment, the device further comprises a thermoelectric generator, wherein the generator is adapted to receive thermal energy from the thermal energy conduction element and convert the thermal energy into electrical energy.

BRIEF DESCRIPTION OF THE DRAWINGS

Specific embodiments will now be discussed in detail with reference to the accompanying drawings, in which.

DETAILED DESCRIPTION

Figure 1:
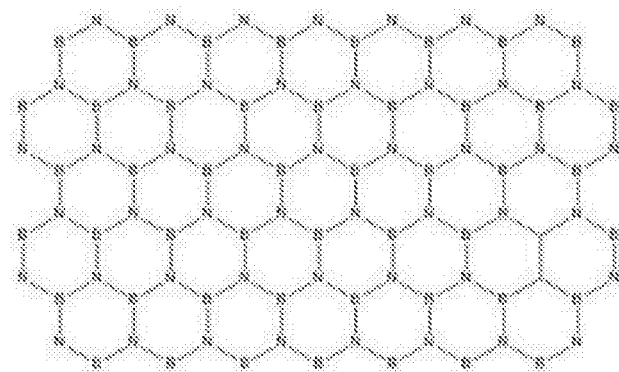
FIG. 1 shows the graphite-like structure of a planar sheet of h-BN.

As set out above, in the first aspect provides a device for protecting a body from damage. The (protective) device comprises an outer protective cover, the outer protective cover comprising a thermal energy conduction element for transferring thermal energy through at least part of the protective cover, and an inner assembly located adjacent to (or behind) the outer protective cover, the inner assembly comprising a thermal energy transfer device adapted to transfer thermal energy to and/or from the thermal energy conduction element. The thermal conduction element comprises a graphite-like or pyrolytic graphite-like material and the thermal energy transfer device comprises a thermal energy transfer fluid. The second aspect provides a device for protecting a body from damage, the (protective) device comprising: an outer protective cover, the outer protective cover comprising a thermal energy conduction element for transferring thermal energy through at least part of the protective cover; and an inner assembly adjacent to (e.g. located behind) the outer protective cover. The inner assembly comprises a thermal energy transfer device adapted to transfer thermal energy to and/or from the thermal energy conduction element; and a support structure. The thermal conduction element comprises a graphite-like or pyrolytic graphite-like material; and wherein the support structure comprises an aerogel.

This device advantageous provides protective function as well as a heat management function. The device can a body (e.g. a device, or element) from damage. For example, the device can be used as an outer housing for a body or a skin on a body, such as an aerospace vehicle. Thermal energy damage (e.g. damage as a result of heat or cold) can be transmitted across the surface of the cover or through the depth of the cover or both. The cover also protects the body and inner assembly from physical damage, such as an impact from an external object.

Thermal Energy Conduction Element

One important aspect of the invention in both the first and second aspects is the use of a graphite-like or pyrolytic graphite-like material. These have high thermal conductivities (graphene 600 $W·m^{-1}·k^{-1}$, pyrolytic boron nitride 42 $W·m^{-1}·k^{-1}$; pyrolytic graphite 1700 $W·m^{-1}·k^{-1}$ at RT, 2800 $W·m^{-1}·k^{-1}$ at 150K), while also providing advantageous properties. For example, these materials are anisotropic, in the sense that some of their properties are directional. Perpendicular to their 2D planes, for example, these tend to be insulating (electrically and thermally), but in the plane they have high conductivities (electrical and thermal). The insulation function can be used to reradiate heat back into the atmosphere or protect internal components from damage. The high conductivity can be used to rapidly transfer heat across the cover and through the device.

In one embodiment, the thermal energy conducting element comprises pyrolytic graphite. This is a man-made product that is typically formed by pyrolysis of a hydrocarbon gas to a point nearly at its decomposition temperature and allowing the graphite to crystalize (see Ratner, Buddy D. (2004). Pyrolytic carbon. In Biomaterials science: an introduction to materials in medicine. Academic Press. p. 171-180, which is incorporated herein by reference). The crystalline structure of pyrolytic carbon has a distorted lattice structure with random un-associated carbon atoms unlike e.g. graphite. The morphology of the pyrolytic graphite means that it is unaffected by extreme acceleration/deceleration, so it is particularly advantageous for vehicles, particularly in aerospace applications.

As set out above, in embodiments, the graphite-like material may comprise graphite, graphene, hexagonal boron nitride. Other structures with varying amounts of carbon, boron, nitrogen and combinations thereof are also embodiments (e.g. see "Syntheses and Structures of New Graphite-like Materials of Composition BCN(H) and BC$_3$N(H)" Kawaguchi, Kawashima, and Nakajima Chem. Mater. 1996, 8, 6, 1197-1201). The pyrolytic graphite-like material can be selected pyrolytic graphite, pyrolytic carbon, pyrolytic hexagonal boron nitride, or combinations thereof. In embodiments, the graphite-like or pyrolytic graphite-like materials may be in the form of sheets, platelets, or other structures (e.g. fullerenes, nanotubes).

The thermal energy conduction element may be an element formed purely of the graphite-like or pyrolytic graphite-like material or this may be in the form of a composite material or a composition comprising the graphite-like or pyrolytic graphite-like material. This may, alternatively, be in the form of an annealed graphite-like or pyrolytic graphite-like material. For example, annealed pyrolytic graphite (APG).

In some embodiments, the graphite-like or pyrolytic graphite-like material may be functionalised and/or doped. This may further tube the properties of the material and improve, for example, incorporation into further materials or matrices. Functionalisation may involve treating the material to incorporate functional groups on the surface and/or edges of the graphite-like or pyrolytic graphite-like materials. Example functional groups include comprise thiol, hydroxyl, carboxyl, epoxyl and/or carbonyl groups. This can be, for example, functionalising using plasma treatment. For example, in some embodiments graphene may be functionalised using (additional) carboxyl groups. One example is a plasma treatment of "oxygen" functionalisation using the Haydale HDLPAS process, which is set out in WO 2010/142953 A1.

Nanofluids

As set out above, in some embodiments the devices may use nanofluids as a thermal transfer fluid. These are excellent replacements for traditional cooling fluids as the added nanomaterial component can increase the thermal conductivity of the fluid by up to 85% while having a minimal effect on other properties such as the viscosity of the fluid. Some example nanoparticles for use in thermal energy transfer fluids are shown in Table 1 below, together with their properties.

TABLE 1

Example nanoparticles and nanofluids

| Material | Structure | Size (nm) | Shape | Material Thermal Conductivity ($W · m^{-1} · k^{-1}$) | Nanofluid Thermal Conductivity ($W · m^{-1} · k^{-1}$) |
| --- | --- | --- | --- | --- | --- |
| ZnO | Wurtzite | 25 | Round | 37-147 | 0.732 Aqueous 5 wt % |
| Hexagonal Boron Nitride | hexagonal | 3000 | Plate | 600 ≡ 30 ∣ | 1.051 Aqueous 0.5 wt % |
| Graphene | 5-7 layer | 5000 | Plate | 300-5300 | 0.877 Aqueous 0.5 wt % |
| Diamond | Tetrahedral network | 6 | round | 2200 | 0.345 Mineral oil 0.5 wt % |

In an embodiment, the nanoparticles are selected from graphite-like materials. Hexagonal boron nitride and graphene provide particularly effective nanoparticles. In a preferred embodiment, the number of layers in the nanoparticles is less than 15 for graphite-like materials, preferably less than 10. Thermal conductivity performance falls off with the increase in layer numbers. The phonon transfer associated with thermal diffusion is interrupted by the presence of van der Waals bonds between the layers along with graphene containing 3 (although it is a 2D material) acoustic phonon modes, two in-plane and one perpendicular plane with the perpendicular mode dominant at lower temperatures. Hexagonal boron nitride has similar issues with phonon transfer, though these are less pronounced.

Hexagonal boron nitride is particularly advantages in nanofluids as it is thermally stabile (up to 900° C. even in an oxidizing atmosphere). The partly ionic structure of BN layers in hexagonal boron nitride reduces covalency and electrical conductivity, whereas the interlayer interaction increases resulting in higher hardness of hexagonal boron nitride relative to graphite. Hexagonal boron nitride lubricant is particularly useful when the electrical conductivity (the significantly reduced electrical properties) or chemical reactivity of graphite (alternative lubricant) would be problematic. In addition, hexagonal boron nitride does not require water or gas molecules trapped between the layers to achieve lubricity, therefore, h-BN lubricants can be used even in vacuum. The interlayer registry of the boron nitride sheets within the hexagonal boron nitride form differs from that seen with graphite. For example, as the atoms are eclipsed with boron atoms lying over and above nitrogen atoms due to their size difference. FIG. 1 shows what this structure looks like from above and highlights how different edge effects can be presented in a single sheet.

Figure 2:
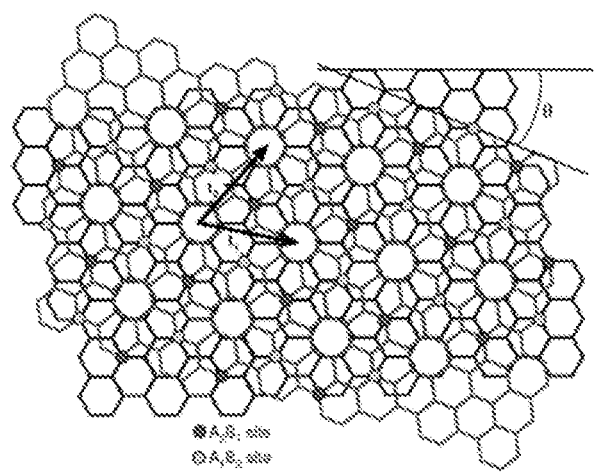
FIG. 2 shows the structure of turbostratic h-BN.

Particularly effective materials are turbostratic hexagonal boron nitride and turbostratic graphene. In one embodiment, the nanofluid comprises turbostratic hexagonal boron nitride and/or turbostratic graphene. In turbostratic h-BN and turbostratic graphene, the basal planes are displaced (see e.g. FIG. 2). In h-BN, the size difference between the boron and nitrogen atoms allows for easy displacement between the basal planes between boron nitride sheets giving rise to what is called a turbostratic structure.

In embodiments, the thermal transfer fluid utilises this turbostratic structure to maximise the thermal properties. The large gap between the layers allows for an easier intercalation of molecules between the planar sheets of the h-BN or graphene. In some embodiments, functionalisation allows functional groups (e.g. OH and COOH groups) to be intercalated into the structure. In some embodiments, there may be further functionalisation in the form of chemically (covalently) bonding functional groups (e.g. OH molecules) to the reactive sites on the edges of the plate and to error sites on the surface through the use of low temperature plasma process. This allows for easy wetting of the functionalised material in a number of continuous phases (water, for example), and magnifies the effect of ultrasonic cavitation to cleave the starting materials into smaller stacks of planar structures. As set out above, this increases the thermal conductivity of the resultant nanofluid. Functionalising the edges of the plates with molecules, such as OH or COOH, has the additional benefit of providing stabilisation in the nanofluid. OH functionalisation provides an active bond into the hydrogen bonded water structure for example, and COOH allows for bonding into hydrocarbon-based fluids. Hexagonal boron nitride is not readily wettable with de-ionised water so a surfactant is required to allow a stable dispersion to form.

This covalent bonding of the functional groups to the h-BN and graphene plate edges and surfaces is thus advantageous for two reasons: 1) Stabilisation of the particles in the resultant nanofluid protects the fluid, long term, from agglomeration and short-term from sedimentation issues. 2) Long-chain organic compounds used as surfactants can inhibit the transfer of phonons from the heat source into the hexagonal boron nitride plate—i.e. the long chain compounds insulate the h-BN and graphene and stop the heat flow. The use of ultra-short groups, i.e. OH or COOH groups minimises this insulating effect.

Energy Generation

As set out above, the devices disclosed herein may further comprise a thermoelectric generator. This allows use of any thermal energy received by the device. This can be particularly advantageous where there will be significant heat input into the device, for example thermal energy associated with re-entry or highspeed vehicles. The thermoelectric generator, or Seebeck generator, is a solid-state device that converts heat flux to electrical energy through a phenomenon known as the Seebeck effect. This effect describes that a temperature gradient in a conducting material results in heat flow; this results in the diffusion of charge carriers. The flow of charge carriers between the hot and cold regions in turn creates a voltage difference. Thermocouples manufactured from iron and copper wires, mounted in series, known as a thermopile, can be used to generate current when a temperature differential is applied. The voltage generated is directly proportional to the temperature differential.

Thus, in embodiments, the thermal energy transfer device may transfer thermal energy (heat) from the outer protective cover to the thermoelectric generator. This can be used to power components in the device and/or associated body and/or the electrical energy may be stored in a storage device.

In embodiments, the thermoelectric generator comprises graphene. Thermoelectric conversion requires excellent electrical conductivity and poor thermal conductivity to ensure that heat gets electrons moving. However, the relationship between the thermal conductivity of electrons and the electrical conductivity of a material is, in most cases, fixed. With graphene, however, the electrons and atoms do not often collide given that the electrons are located in clouds above and below atomic plane, so the transfer of energy from electrons to phonons is very efficient. However, the electrons collide with other electrons which results in a net charge flow in one direction (an electrical current), while the heat transfer is reduced by the collisions among electrons. This provides high electrical conductivity but low thermal conductivity.

Specific Embodiments

Figure 3:
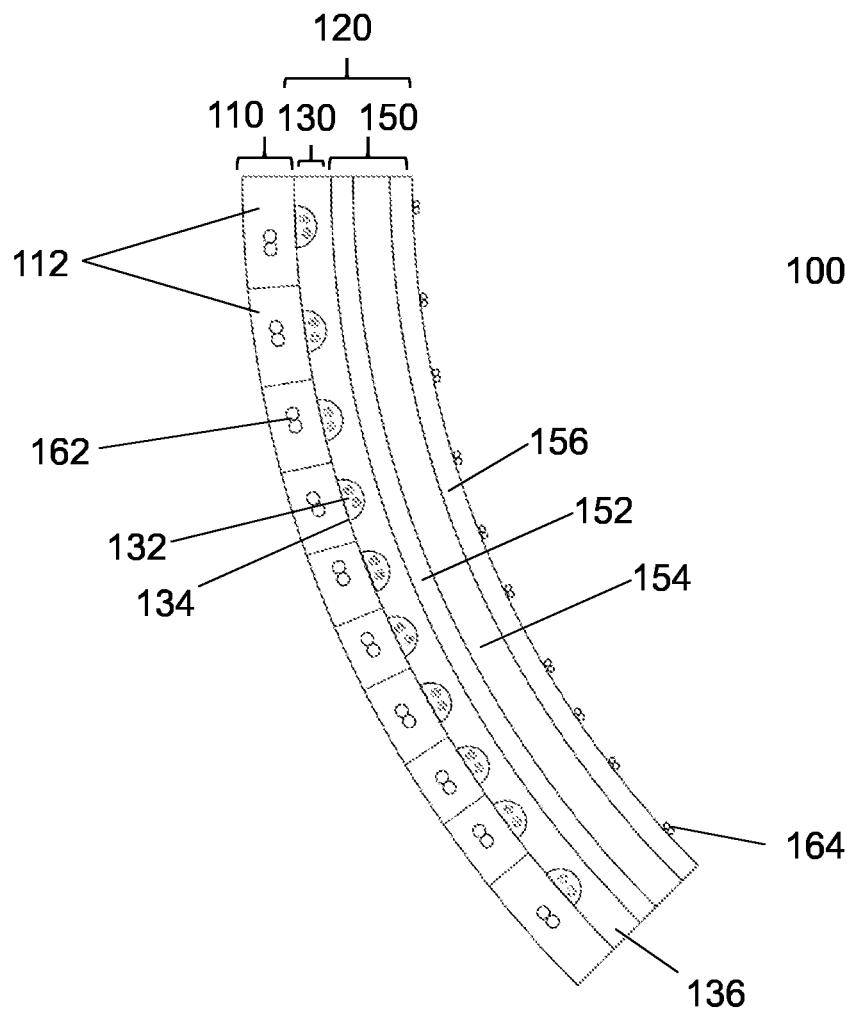
FIG. 3 shows a cross-sectional view of an embodiment according the invention.

One embodiment of the invention is shown in FIG. 3. This embodiment shows a device according to the invention in the form of an outer skin 100 for protecting an aerospace vehicle (not shown) from heat and physical damage. FIG. 3 shows a cross-section through the skin. Although not shown, the skin forms a cylindrical body which forms part of a forward section of an aerospace vehicle.

The skin 100 comprises an outer protective cover 110 and an inner assembly 120. The outer protective cover 110 forms the outer surface of the aerospace vehicle and thus is exposed to the environment during travel. The outer layer is formed of a layer of tiles 112 comprising a graphite-like or pyrolytic graphite-like material. This allows the use of tiles allows for easier manufacture of the pyrolytic graphene material.

The inner assembly 120 is provided on the internal surface of the outer protective cover 110 and comprises a thermal energy transfer device 130 in the form of a thermal energy transfer layer comprising a fluid-based system. The thermal energy transfer device 130 comprises a plurality of semi-circular (in cross-section) pipes 134 filled with a thermal energy transfer fluid 132. The pipes 134 are held in place by an insulating adhesive block 136. In this embodiment, the thermal energy transfer fluid 134 comprises nanoparticles. The pipes 134 are arranged to contact the inner surface of the tiles 112 and are adapted to draw heat away from the outer protective cover 110. The pipes 134 carry heat away from the outer surface to a heat sink located centrally in the body of the aerospace vehicle (not shown). The inner assembly 120 also comprises a support structure 150. This support structure 150 comprises an layer of an aerogel monolith 154 with protective layers 152, 156 provided on either side of the aerogel monolith 154. This support structure 150 acts as a scaffold on which the outer protective cover 110 and thermal energy transfer device 130 are formed and supported. The support structure 150 also protects the vehicle and any internal components from external physical damage, as well as acting as an insulator protecting the remainder of the vehicle from heat damage.

The device 100 also includes a thermoelectric generator comprising hot junctions 162 located in the tiles 112 of the outer protective cover 110 and cold junctions located on the inner surface of the support structure 164. The aerogel monolith 154 also acts as an insulator between the hot and cold junctions.

In use, the device 100 can protect the aerospace vehicle from heat and physical damage. The outer protective cover 110 acts as a heat shield and a physical shield due to the properties of the graphite-like/pyrolytic graphite-like materials preventing damage to the internal components of the vehicle. Hot spots are reduced by the tiles 112 spreading heat across the outer surface of the outer protective cover 110. Heat that is transferred through the tiles 112 is then either transferred to another part of the vehicle using the fluid pipes 134 and nanofluid (powered by a pump (not shown)) so that the heat can be dissipated in a cooler part of the vehicle or it is converted into electrical energy by the thermoelectric generator. Use of the thermoelectric generator will further dissipate heat and will provide a source of electrical energy on the vehicle, reducing the reliance on batteries or other methods of electrical energy generation.

Although the embodiment of FIG. 3 relies on a fluid-based thermal energy transfer system, in alternative embodiments, this may be a solid based thermal transfer system. For example, the inner assembly may comprise a series of vias or thermally conductive tracks which direct heat away from the tiles 112 and to a part of the device where this can be dissipated.

Other variations to the disclosed embodiments can be understood and effected by those skilled in the art in practicing the claimed invention, from a study of the drawings, the disclosure, and the appended claims. For example, in the examples above:

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A device for protecting a body from damage, the device comprising:
    an outer protective cover, the outer protective cover comprising a thermal energy conduction element for transferring thermal energy through at least part of the outer protective cover; and
    an inner assembly adjacent to the outer protective cover, the inner assembly comprising a thermal energy transfer device adapted to transfer thermal energy to and/or from the thermal energy conduction element,
    wherein the thermal energy conduction element comprises a graphite-like or pyrolytic graphite-like material;
    wherein the thermal energy transfer device comprises a thermal energy transfer fluid; and
    wherein the thermal energy transfer fluid comprises a nanofluid, the nanofluid comprising hexagonal boron nitride nanoparticles and/or graphene nanoparticles.

2. The device of claim 1, wherein the graphite-like or pyrolytic graphite-like material is selected from graphene, pyrolytic graphite, pyrolytic carbon, pyrolytic hexagonal boron nitride, or combinations thereof.

3. The device of claim 1,
    wherein the outer protective cover comprises a housing; and
    wherein the thermal energy conducting element is enclosed within the housing.

4. The device of claim 1, further comprising a thermoelectric generator, wherein the thermoelectric generator is adapted to receive thermal energy from the thermal energy conduction element and convert the thermal energy into electrical energy.

5. The device of claim 1, wherein the hexagonal boron nitride nanoparticles are turbostratic hexagonal boron nitride nanoparticles and the graphene nanoparticles are turbostratic graphene nanoparticles.

6. The device of claim 1, wherein the hexagonal boron nitride nanoparticles and/or graphene nanoparticles are functionalised with OH and COOH functional groups.

7. The device of claim 1, wherein the hexagonal boron nitride nanoparticles comprise less than 15 hexagonal boron nitride layers in each nanoparticle and/or graphene nanoparticles comprise less than 15 graphene layers in each nanoparticle.

8. The device of claim 1, wherein the inner assembly further comprises a support structure arranged to support the outer protective cover by providing a scaffold on which the outer protective cover is formed.

9. The device of claim 8, wherein the support structure comprises an aerogel.

10. The device of claim 9, wherein the support structure further comprises a composite comprising first and second layers, the first layer comprising the aerogel and the second layer comprising a protective layer.

11. A device for protecting a body from damage, the device comprising:
    an outer protective cover, the outer protective cover comprising a thermal energy conduction element for transferring thermal energy through at least part of the outer protective cover; and
    an inner assembly adjacent to the outer protective cover, the inner assembly comprising:
        a thermal energy transfer device adapted to transfer thermal energy to and/or from the thermal energy conduction element;
    a support structure; and
    a thermoelectric generator, wherein the thermoelectric generator is adapted to receive thermal energy from the thermal energy conduction element and convert the thermal energy into electrical energy,
    wherein the thermal energy conduction element comprises a graphite-like or pyrolytic graphite-like material;
    wherein the support structure comprises an aerogel.

12. The device of claim 11, wherein the graphite-like or pyroltyic graphite-like material is selected from graphene, pyrolytic graphite, pyrolytic carbon, pyrolytic hexagonal boron nitride, or combinations thereof.

13. The device of claim 11 wherein the thermal energy transfer device comprises a thermal energy transfer fluid.

14. The device of claim 13, wherein the thermal energy transfer fluid comprises a nanofluid.

15. The device of claim 14, wherein the nanofluid comprises at least one of ZnO, hexagonal boron nitride, graphene or diamond nanoparticles.

\* \* \* \* \*